(12) United States Patent
Li

(10) Patent No.: US 12,160,860 B2
(45) Date of Patent: Dec. 3, 2024

(54) METHOD AND DEVICE FOR ACTIVATING TRANSMISSION CONFIGURATION INDICATOR STATE, AND STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 241 days.

(21) Appl. No.: 17/641,338

(22) PCT Filed: Sep. 20, 2019

(86) PCT No.: PCT/CN2019/107036
§ 371 (c)(1),
(2) Date: Mar. 8, 2022

(87) PCT Pub. No.: WO2021/051402
PCT Pub. Date: Mar. 25, 2021

(65) Prior Publication Data
US 2022/0377770 A1    Nov. 24, 2022

(51) Int. Cl.
*H04W 72/1273* (2023.01)
*H04L 5/00* (2006.01)
*H04W 16/28* (2009.01)
*H04W 28/06* (2009.01)
*H04W 48/20* (2009.01)
*H04W 72/044* (2023.01)
*H04W 72/0457* (2023.01)
*H04W 72/23* (2023.01)
(Continued)

(52) U.S. Cl.
CPC ....... *H04W 72/1273* (2013.01); *H04W 48/20* (2013.01); *H04W 76/19* (2018.02); *H04W 80/02* (2013.01)

(58) Field of Classification Search
CPC . H04W 72/1273; H04W 48/20; H04W 76/19; H04W 80/02; H04W 72/23; H04W 72/231; H04W 28/06; H04W 72/0457; H04W 72/046; H04W 16/28; Y02D 30/70; H04L 5/0053; H04L 5/0098; H04L 5/0044
See application file for complete search history.

(56) References Cited

U.S. PATENT DOCUMENTS

2019/0230545 A1    7/2019  Liou et al.
2020/0100154 A1*   3/2020  Cirik ............... H04B 7/0695
(Continued)

FOREIGN PATENT DOCUMENTS

CN    109076560 A    12/2018
CN    109962765 A    7/2019

OTHER PUBLICATIONS

International Search Report of PCT Application No. PCT/CN2019/107036 dated Jun. 28, 2020 with English translation, (6p).
(Continued)

*Primary Examiner* — Harry H Kim
(74) *Attorney, Agent, or Firm* — Arch & Lake LLP

(57) ABSTRACT

A method for activating a TCI state includes: receiving a first MAC CE signaling, the first MAC CE signaling for activating a first TCI state; and using the first TCI state as TCI states of all serving cells on the same frequency band.

19 Claims, 10 Drawing Sheets

(51) Int. Cl.
  *H04W 72/231* (2023.01)
  *H04W 76/19* (2018.01)
  *H04W 80/02* (2009.01)

(56) References Cited

U.S. PATENT DOCUMENTS

| | | | | |
|---|---|---|---|---|
| 2020/0145280 | A1* | 5/2020 | Cirik | H04L 41/0668 |
| 2020/0351039 | A1* | 11/2020 | Zhou | H04L 5/0098 |
| 2021/0185609 | A1* | 6/2021 | Zhou | H04W 72/21 |
| 2022/0338230 | A1* | 10/2022 | Yu | H04L 5/0053 |
| 2024/0049083 | A1* | 2/2024 | Cirik | H04B 7/0695 |

OTHER PUBLICATIONS

"Enhancements on MIMO for NR3", Status Report to TSG, GPP TSG RAN Meeting #85, RP-191953, Newport Beach, US, Sep. 16-20, 2019, (13p).

ZTE, "Remaining Issues on QCL", Discussion and Decision, 3GPP TSG RAN WG1 Meeting #93, R1-1805836, Busan Korea, May 21-25, 2018, (7p).

Sony, "Remaining Issues on Rel.15 Beam Management", Discussion, 3GPP TSG-RAN WG1 #94bis, R1-1810628, Chengdu, China, Oct. 8-12, 2018, (5p).

JPOA of Application No. 2022-517464 dated on Apr. 28, 2023 with English translation,(14p).

Qulacomm Incorporated, "Enhancements on Multi-beam Operation" 3GPP TSG-RAN WG1 Meeting #98, R1-1909273, Prague, Czech, Aug. 26-30, 2019, (4p).

Huawei, HiSilicon, "Discussion on the remaining issues on BWP switch delay", 3GPP TSG-RAN WG4 Meeting #91, R4-1905590, Reno, USA, May 13-17, 2019, (3p).

LG Electronics, "Feature lead summary#4 of Enhancements on Multi-beam Operations", 3GPP TSG RAN WG1 Meeting #98 R1-1909779, Prague, CZ, Aug. 26-30, 2019, (38p).

KROA issued in application KR 10-2022-7011885 dated Sep. 6, 2024 with English translation, (13p).

* cited by examiner

METHOD AND DEVICE FOR ACTIVATING TRANSMISSION CONFIGURATION INDICATOR STATE, AND STORAGE MEDIUM

CROSS-REFERENCE TO RELATED APPLICATION

The present application is a U.S. National Stage of International Application No. PCT/CN2019/107036, filed on Sep. 20, 2019, the entire content of which is incorporated herein by reference for all purposes.

TECHNICAL FIELD

The disclosure relates to the field of communication technologies, and more particularly, to a method and a device for activating a transmission configuration indicator (TCT) state, and a storage medium.

BACKGROUND

It usually needs to transmit data through beams in a new radio (NR) communication system, to ensure coverage and resist path loss. In a process of transmitting data through beams, a network device (such as a base station) indicates a TCI state through a signaling and further indicates a receiving beam or a transmitting beam of a terminal.

SUMMARY

The disclosure provides a method and an apparatus for activating a TCT state, and a storage medium, to overcome problems in the related art.

According to a first aspect of the disclosure, a method for activating a TCI state is provided. The method is applicable to a terminal. The method includes: receiving a first MAC CE signaling, the first MAC CE signaling for activating a first TCI state; and using the first TCI state as TCI states of all serving cells on the same frequency band.

According to a second aspect of the disclosure, a method for activating a TCI state is provided. The method is applicable to a network device. The method includes: selecting a first serving cell from all serving cells on the same frequency band of a terminal, the first serving cell for supporting transmission of a MAC CE signaling; and transmitting a first MAC CE signaling using the selected first serving cell, the first MAC CE signaling for activating a first TCI state.

According to a third aspect of the disclosure, a device for activating a TCI state is provided. The device includes: a processor; and a memory for storing instructions executable by the processor; in which the processor is configured to perform the method as described in the first aspect or any embodiment in the first aspect.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
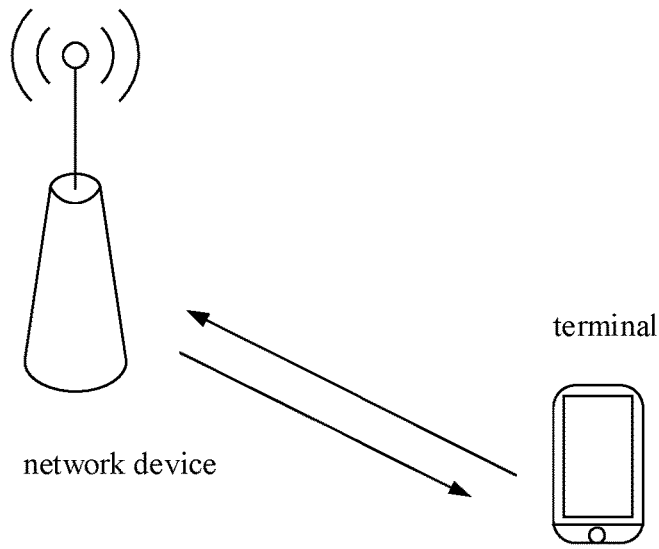
FIG. 1 is a schematic diagram illustrating a wireless communication system according to some embodiments.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

The method for activating the TCI state provided in embodiments of the disclosure may be applicable to a wireless communication system in FIG. 1. Referring to FIG. 1, the wireless communication system includes a network device and a terminal. The terminal is connected to the network device and performs data transmission with the network device through wireless resources.

It should be understood that the wireless communication system in FIG. 1 is only for schematic illustration. The wireless communication system may also include other network devices such as core network devices, wireless relay devices and wireless backhaul devices, which are not shown in FIG. 1. Embodiments of the disclosure do not limit the number of network devices and the number of terminals included in the wireless communication system.

It should be further understood that the wireless communication system in embodiments of the disclosure is a network that provides wireless communication functions. The wireless communication system may use different communication technologies, such as code division multiple access (CDMA), wideband code division multiple access (WCDMA), time division multiple access (TDMA), frequency division multiple access (FDMA) orthogonal frequency-division multiple access (OFDMA), single carrier FDMA (SC-FDMA), or carrier sense multiple access with collision avoidance. Based on capacities, speeds, delays and other factors of different networks, the networks may be grouped into a second generation wireless communication technology (2G), a third generation wireless communication technology (3G), a fourth generation wireless communication technology (4G) or future evolution network such as a fifth generation wireless communication technology (5G). The 5G network may also be referred to as a new radio (NR) network. For the convenience of description, the wireless communication network is sometimes referred to as a network in the disclosure.

Further, the network device involved in the disclosure may also be referred to as a wireless access device. The wireless access device may be a base station, an evolved node base station (eNB), a home base station, an access point (AP) in a wireless fidelity (WI-FI) system, a wireless relay node, a wireless backhaul node, a transmission point (TP), a transmission and reception point (TRP), a next generation node base station (gNB) in the NR system, a component or part of a device that constitutes the base station or the like. It should be understood that, in embodiments of the disclosure, the specific technology and specific device form adopted by the network device are not limited. In the disclosure, the network device may provide communication coverage for a specific geographic area and may communicate with the terminal located in the coverage area (cell). In addition, when it is a vehicle-to-vehicle (V2X) communication system, the network device may also be a vehicle-mounted device.

Further, the terminal involved in the disclosure may also be referred to as a terminal device, a user equipment (UE), a mobile station (MS), a mobile terminal (MT) or the like, which is a device that provides voice and/or data connectivity for a user. For example, the terminal may be a handheld device or vehicle-mounted device with a wireless connection function. At present, some examples of terminals are mobile phones, pocket personal computers (PPCs), handheld computers, personal digital assistants (PDAs), notebook computers, tablet computers, wearable devices, vehicle-mounted devices or the like. In addition, when it is the V2X communication system, the terminal device may also be a vehicle-mounted device. It should be understood that in embodiments of the disclosure, the specific technology and specific device form adopted by the terminal are not limited.

In the NR, especially when the communication frequency band is in frequency range 2, because the high-frequency channel attenuates quickly, beam-based transmission and reception are required between the terminal and the network device to ensure coverage.

In the related art, a beam management process of the PDCCH or PDSCH of the downlink (DL) is as follows. A random access between the terminal and the network device is completed and a RRC connection between the terminal and the network device is established. The terminal performs measurement based on a measurement configuration of the network device and reports a measurement result of the beam to the network device, including a reference signal (RS) type, an RS index and a layer1-reference signal receiving power (L1-RSRP) or a layer1 signal to interfere&noise ratio (L1-SINR), of the beam. The network device determines multiple TCI states based on the measurement result reported by the terminal. The TCI state includes a TCI state identification (ID) and an RS type and RS index corresponding to the TCI state. The number of TCI states at present is up to 64. The network device informs the terminal of these 64 TCI states through a RRC signaling, including the TCI state IDs and corresponding RS types and RS indices. The TCI state is shown in Table 1 below. The terminal may determine a receiving beam through the TCI state.

TABLE 1

| TCI state | RS index | Notes |
| --- | --- | --- |
| TCI state #0 | SSB index #1 | If the network device informs the terminal to use TCI state #0, it informs the terminal to receive PDSCH using a receiving beam with a strongest signal intensity when receiving SSB index #1. |

For the PDCCH, the network device uses the MAC CE to activate one TCI state among the 64 TCI states and indicates it to the terminal. For the PDSCH, the network device uses the MAC CE to activate a set of TCI states (8 TCI states among the 64 TCI states) and indicates it to the terminal. The network device uses a downlink control information (DCI) signaling to indicate one of eight activated TCI states to the terminal to receive the PDSCH. The TCI state of the PDSCH scheduled in the DCI signaling, informs the terminal that the receiving beam used to receive the PDSCH should be the same as the receiving beam used when the received signal is the strongest if the terminal receives the RS in the TCI state.

In the related art, the network device determines multiple TCI states based on a measurement result reported by the terminal and notifies the multiple TCI states to the terminal through a radio resource control (RRC) signaling. For each component carrier (CC), i.e., a serving cell/a bandwidth part (BWP), a TCI state that needs to be activated in the multiple TCI states is indicated through a medium access control (MAC) control element (CE). If there are multiple serving cells/BWPs configured by the terminal, the base station needs to transmit multiple MAC CE signalings to activate TCI states on the multiple serving cells/BWPs, which causes more signaling overhead.

In the related art, a separate MAC CE is used for each CC/BWP to activate the corresponding TCI state. In a scenario of multiple CCs/BWPs, if a separate MAC CE is used for each CC/BWP to activate the corresponding TCI state, the signaling overhead is relatively large.

In view of this, the disclosure provides a method for activating a TCI state. In the method for activating the TCI state provided in the disclosure, TCI states for PDCCHs on all CCs/BWPs or sets of TCI states for PDSCHs on all CCs/BWPs on the same frequency band may be activated through one MAC CE.

Figure 2:
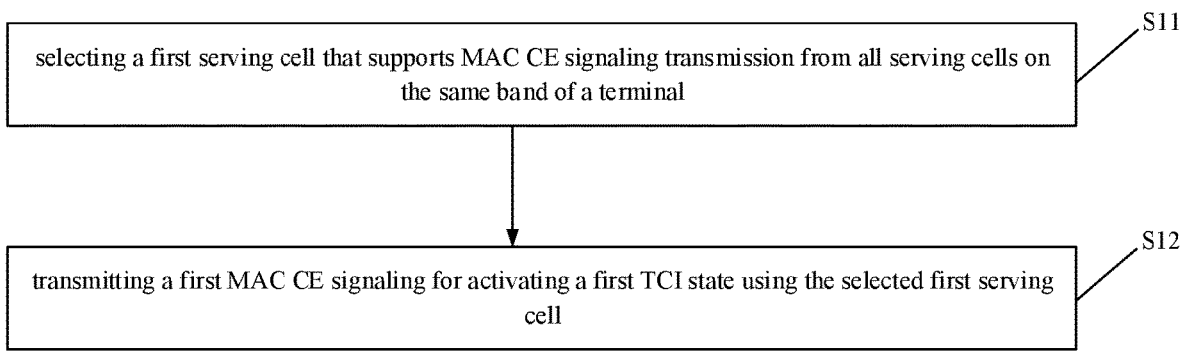
FIG. 2 is a flow chart illustrating a method for activating a TCI state according to some embodiments.

FIG. 2 is a flow chart illustrating a method for activating a TCI state according to some embodiments. As illustrated in FIG. 2, the method for activating the TCI state is applicable to a network device and includes the following S11 and S12.

In S11, a serving cell that supports MAC CE transmission is selected from all serving cells on the same band of the terminal.

In the disclosure, for the terminal, multiple serving cells, namely CCs, are configured on the same band. Each serving cell has an initial BWP or an active BWP. In the disclosure, the network device selects the serving cell that supports MAC CE transmission from all serving cells on the same band and uses the MAC CE signaling on the initial BWP or the active BWP of the terminal on the selected serving cell to activate the TCI state.

In the disclosure, when the network device selects the serving cell, on the one hand, the network device randomly selects the serving cell among all serving cells on the same band of the terminal or selects a designated serving cell among all serving cells on the same band of the terminal. In the disclosure, the designated serving cell selected by the network device is, for example, a serving cell with a lowest carrier frequency among all serving cells on the same band. Or the designated serving cell selected by the network device is a PSCell or a PCell among all serving cells on the same band. Or the designated serving cell selected by the network equipment is a serving cell whose channel is detected to be idle on an unlicensed spectrum, that is, when the frequency band is the unlicensed frequency band, the network device needs to perform channel detection of listen before talk (LBT) for each serving cell of the terminal on the frequency band. In the channel detection process, only the serving cell whose channel is detected to be idle may be used for transmission, so that the designated serving cell may be the serving cell whose channel is detected to be idle.

In the disclosure, the network device transmits the MAC CE signaling through the serving cell to activate the TCI state. The TCI state activated by the MAC CE may be the TCI state of the PDCCH or the set of TCI states of the PDSCH.

In an implementation manner, the network device needs to notify the terminal of all TCI states (for example, 64 TCI states) in advance. For example, the network device pre-notifies the terminal of all TCI states based on the RRC signaling. The TCI state activated through the MAC CE signaling is the TCI state or the set of TCI states among all TCI states.

In S12, a MAC CE signaling for activating a TCI state is transmitted using the selected serving cell.

In the disclosure, the network device selects one serving cell from all serving cells on the same band of the terminal to transmit the MAC CE signaling for activating the TCI states of all serving cells, which may reduce the signaling overhead.

Figure 3:
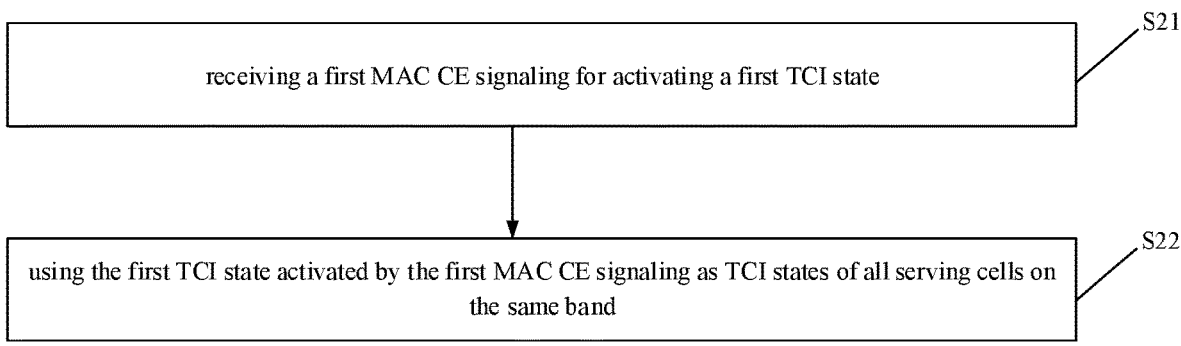
FIG. 3 is a flow chart illustrating a method for activating a TCI state according to some embodiments.

FIG. 3 is a flow chart illustrating a method for activating a TCI state according to some embodiments. As illustrate in FIG. 3, the method for activating the TCI state is applicable to a terminal and includes the following S21 and S22.

In S21, a MAC CE signaling for activating a TCI state is received.

In the disclosure, for the terminal, multiple serving cells, namely CCs, are configured on the same band. Each serving cell has an initial BWP or an active BWP. In one aspect of the disclosure, the terminal determines a serving cell that supports MAC CE signaling reception and transmission and receives the MAC CE signaling through the determined serving cell. The terminal uses the initial BWP or the active BWP of the determined serving cell to receive the MAC CE signaling.

The terminal uses one of the following manners to determine the serving cell for receiving the MAC CE signaling. The MAC CE transmitted by all serving cells that support the MAC CE signaling among all serving cells on the same frequency band of the terminal may be received. Or the serving cell pre-configured by the network device for the terminal may be used as the serving cell for receiving the MAC CE signaling. Or by default, the PSCell or the PCell or the serving cell with the lowest carrier frequency or the serving cell whose channel is detected to be idle on the unlicensed spectrum, among all serving cells on the same frequency band may be used as the serving cell for receiving the MAC CE signaling.

In the disclosure, the MAC CE signaling received by the terminal is used to activate the TCI state and the TCI state may be the TCI state of the PDCCH or the set of TCI states of the PDSCH.

In S22, the TCI state activated by the received MAC CE is used as TCI states of all serving cells on the same band.

In an example of the disclosure, the terminal receives the RRC signaling from the network device in advance and determines all TCI states based on the RRC signaling. After receiving the MAC CE signaling, the TCI state activated by the MAC CE is taken as TCI states of PDCCHs of all serving cells on the same band. Or the set of TCI states activated by the MAC CE is taken as sets of TCI states of PDSCHs of all serving cells on the same band.

In the disclosure, the terminal receives the MAC CE and uses the TCI state activated by the received MAC CE as the TCI states of all serving cells on the same band, which may reduce the signaling overhead.

Further, in the disclosure, the terminal needs to determine all serving cells on the same band.

In some embodiments of the disclosure, the network device transmits in advance a configuration message for notifying the terminal of a bandwidth and carrier position of each serving cell among all serving cells of the terminal, so that the terminal may determine all serving cells on the same band using the bandwidth and carrier position of each serving cell.

Figure 4:
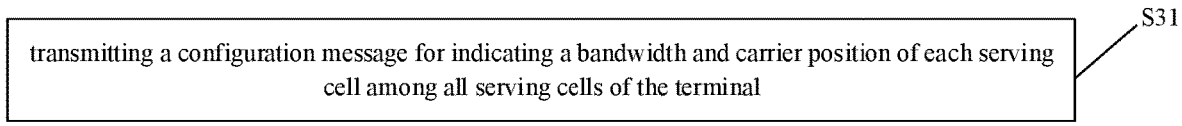
FIG. 4 is a flow chart illustrating a method for determining all serving cells on the same band according to some embodiments.

FIG. 4 is a flow chart illustrating a method for determining all serving cells on the same band according to some embodiments. As illustrated in FIG. 4, the method for determining all serving cells on the same band is applicable to the network device and includes the following S31.

In S31, a configuration message is transmitted and the configuration message is configured to indicate a bandwidth and carrier position of each serving cell among all serving cells of the terminal.

In an example, the network device transmits the configuration message based on a system message and/or RRC signaling.

Further, in the disclosure, after the network device transmits the configuration message, it may perform selecting the serving cell and transmitting the MAC CE signaling. It should be understood that the network device in the disclosure is not limited on whether to perform transmitting the configuration message every time when it selects the serving cell and transmits the MAC CE signaling. Transmitting the configuration message may be performed every time or transmitting the configuration message may be performed for one time.

In the disclosure, the network device transmits the configuration message for indicating the bandwidth and carrier position of each serving cell among all serving cells of the terminal to the terminal, so that the terminal may determine all serving cells on the same band.

Figure 5:
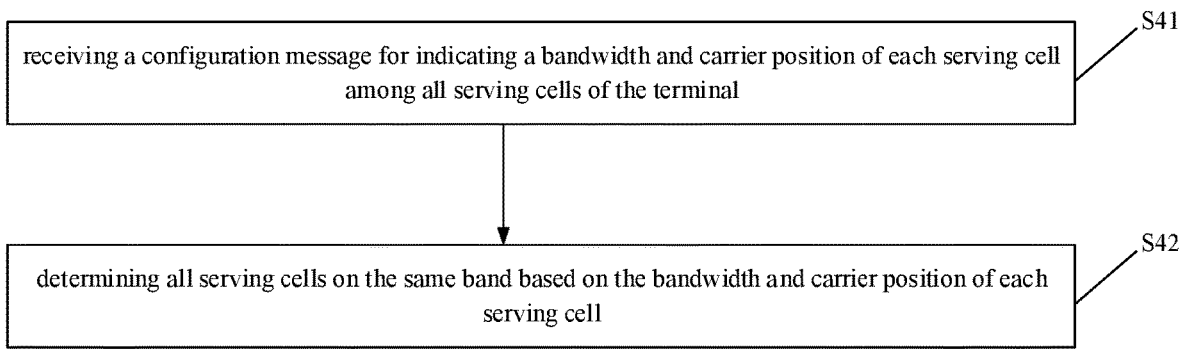
FIG. 5 is a flow chart illustrating a method for determining all serving cells on the same band according to some embodiments.

FIG. 5 is a flow chart illustrating a method for determining all serving cells on the same band according to some embodiments. As illustrated in FIG. 5, the method for determining all serving cells on the same band is applicable to the terminal and includes the following S41 to S42.

In S41, a configuration message is received and the configuration message is configured to indicate a bandwidth and carrier position of each serving cell among all serving cells of the terminal.

The configuration message includes system information and/or serving cell configuration message. In the case of a PCell, its bandwidth and carrier position are obtained by the terminal receiving the system information. In the case of an SCell, its bandwidth and carrier position are obtained through an SCell configuration message transmitted by the PCell.

In an example, the terminal receives the configuration message based on a system information and/or RRC signaling.

In S42, all serving cells on the same band are determined based on the bandwidth and carrier position of each serving cell.

Further, in the disclosure, after the terminal receives the configuration message and determines all serving cells on the same band, it may perform receiving the MAC CE signaling for activating the TCI state and using the TCI state activated by the MAC CE signaling as TCI states of all serving cells on the same band. It should be understood that in the disclosure, each time the terminal receives the MAC CE signaling and uses the TCI state activated by the MAC CE signaling as the TCI states of all serving cells on the same band, it is not limit on whether to perform receiving the configuration message and determining all serving cells on the same band. Receiving the configuration message and determining all the serving cells on the same band may be performed each time or receiving the configuration message and determining all the serving cells on the same band may be performed for one time.

In the disclosure, the terminal receives the configuration message transmitted by the network device to indicate the bandwidth and carrier position of each serving cell among all the serving cells of the terminal, determines all the serving cells on the same band, and adopts the TCI state activated by the received MAC CE as the TCI states of all serving cells on the same band, which saves the signaling overhead.

Further, in the disclosure, when the activated TCI state needs to be updated, for example, a change on a channel condition of the terminal (a new TCI state is determined based on the measurement result fed back by the terminal), a BWP switching on the terminal, an SCell switching on the terminal, a PCell switching or a PSCell switching on the terminal, a PCell or PSCell link failure on the terminal or a serving cell with a beam failure on the terminal, the network device may retransmit the MAC CE for activating the TCI state.

In the disclosure, in order to distinguish different MAC CEs, TCI states and serving cells for transmitting MAC CEs before updating and after updating, the MAC CE involved before updating is referred to as the first MAC CE, the TCI state activated by the first MAC CE is referred to as the first TCI state, the serving cell selected for transmitting the first MAC CE is referred to as the first serving cell, the MAC CE involved after updating is referred to as the second MAC CE, the TCI state activated by the second MAC CE is referred to as the second TCI state and the serving cell selected for transmitting the second MAC CE is referred to as the second serving cell.

Figure 6:
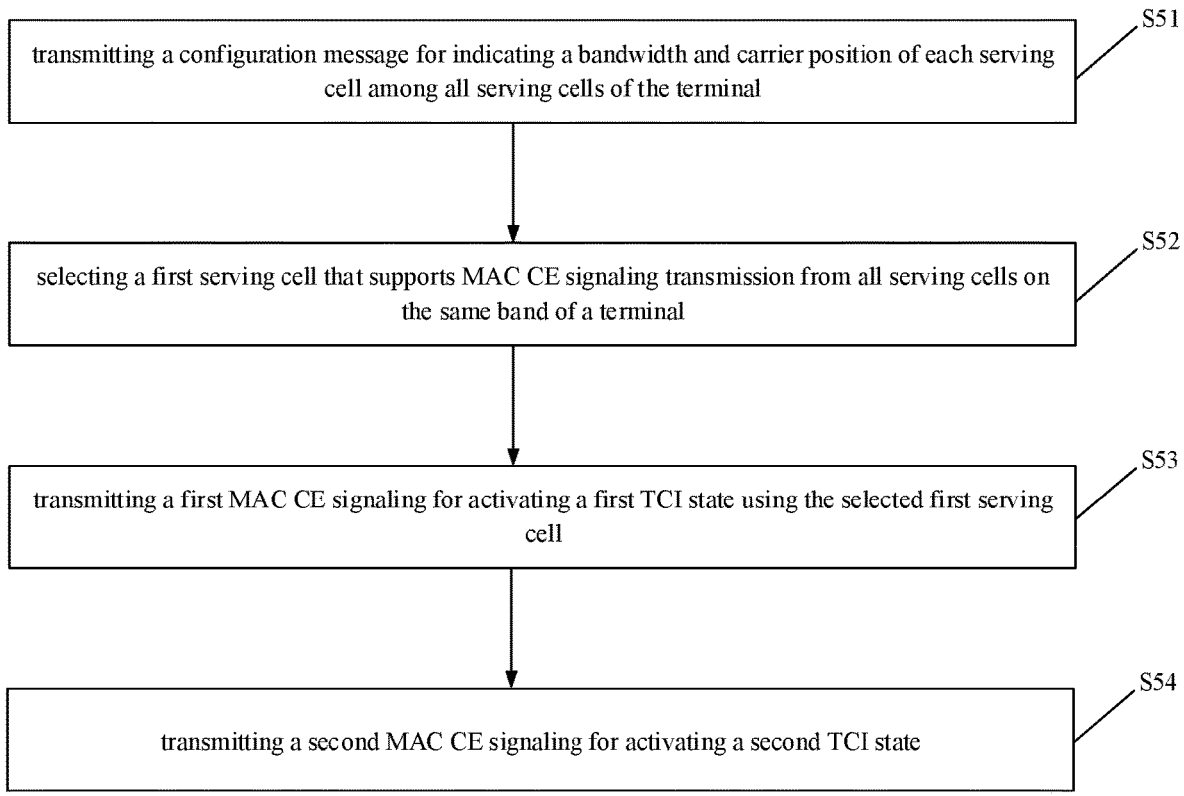
FIG. 6 is a flow chart illustrating a method for activating a TCI state according to some embodiments.

FIG. 6 is a flow chart illustrating a method for activating a TCI state according to some embodiments. As illustrated in FIG. 6, the method for activating the TCI state is applicable to the network device and includes the following S51 to S54. S51, S52 and S53 are the same as S31, S32 and S33, and will not be described in detail in the disclosure.

In S54, a second MAC CE signaling is transmitted and the second MAC CE signaling is configured to activate a second TCI state.

In the disclosure, before transmitting the second MAC CE signaling, the network device needs to confirm that the TCI state needs to be updated, that is, the second TCI state needs to be activated. The need to activate the second TCI state may be understood as one or a combination of the following events: a change on a channel condition of the terminal (determined based on the measurement result fed back by the terminal), a BWP switching on the terminal, an SCell switching on the terminal, a PCell switching or a PSCell switching on the terminal, a PCell or PSCell link failure on the terminal or a serving cell with a beam failure on the terminal.

In the disclosure, when the terminal needs to update the TCI state, the network device retransmits a new MAC CE signaling (the second MAC CE signaling) to activate the new TCI state, so that the terminal may update the TCI state.

In the disclosure, after the network device transmits the second MAC CE signaling to the terminal and after the terminal receives the MAC CE signaling, the terminal may update the first TCI state to the second TCI state activated by the second MAC CE signaling.

However, when there is a BWP switching on the terminal, an SCell switching on the terminal, a PCell switching or a PSCell switching on the terminal, a PCell or PSCell link failure on the terminal or a serving cell with a beam failure on the terminal, how the terminal handles the TCI state is a problem that needs to be solved. The disclosure will exemplarily describe this situation below.

Case 1: BWP Switching Occurs

Figure 7:
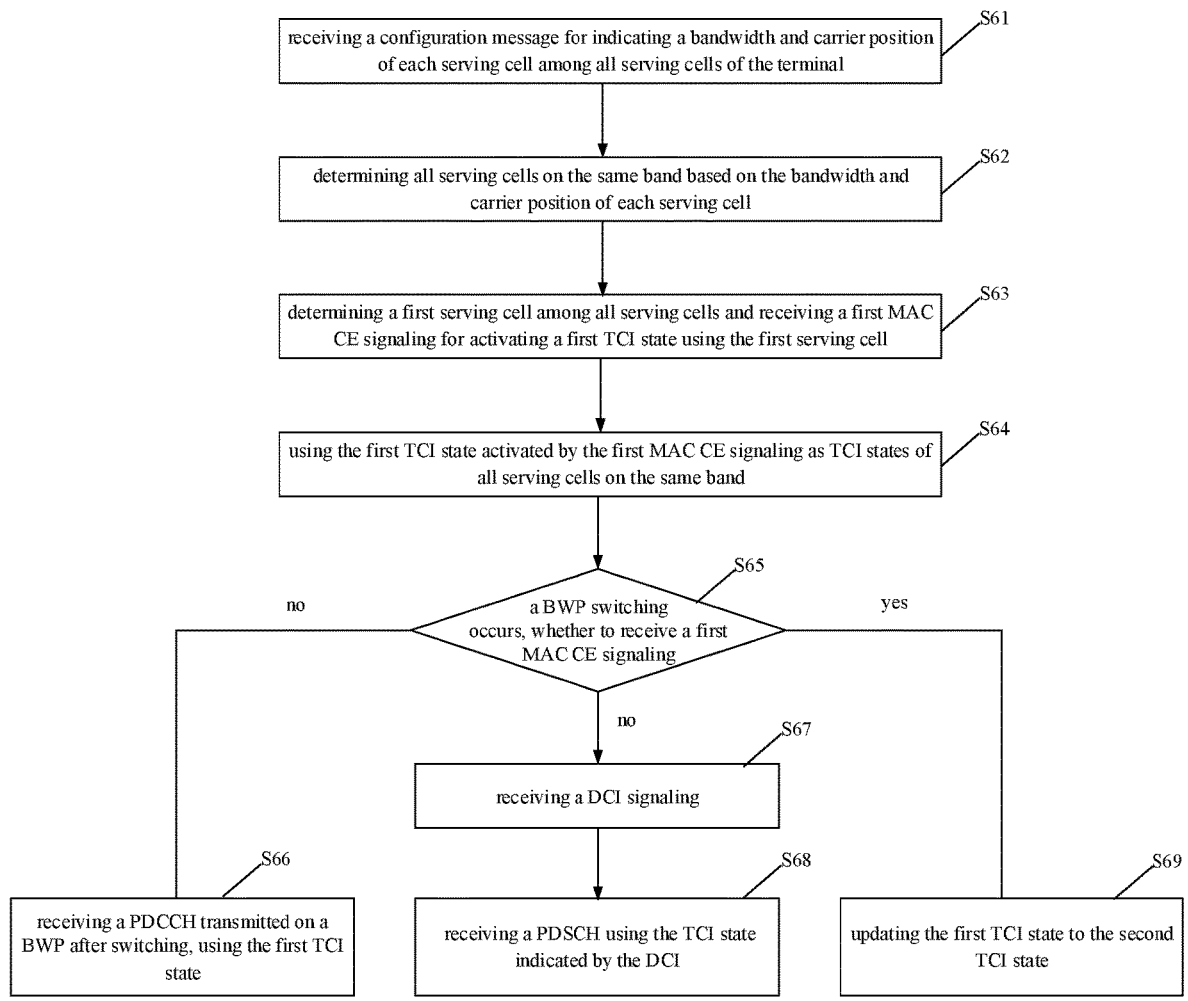
FIG. 7 is a flow chart illustrating a method for activating a TCI state according to some embodiments.

FIG. 7 is a flow chart illustrating a method for activating a TCI state according to some embodiments. As illustrated in FIG. 7, the method for activating the TCI state is applicable to the terminal and includes the following S61 to S69.

In S61, a configuration message is received, in which the configuration message is configured to indicate a bandwidth and carrier position of each serving cell among all serving cells of the terminal.

In S62, all serving cells on the same band are determined based on the bandwidth and carrier position of each serving cell.

In S63, a first serving cell is determined from all serving cells and an initial BWP or an active BWP of the first serving cell is used to receive a first MAC CE signaling for activating a first TCI state.

In S64, the first TCI state activated by the first MAC CE signaling is used as TCI states of all serving cells on the same band.

In S65, it is determined that a BWP switching occurs and it is determined whether to receive a second MAC CE signaling for activating a second TCI state from the network device.

In the disclosure, if the BWP switching occurs on any serving cell among all serving cells on the same band, it is determined that the BWP switching occurs. In the disclosure, the BWP switching on the terminal may be understood as the terminal receiving a newly scheduled BWP from the network device and switching from the original BWP to the newly scheduled BWP.

In the disclosure, the first TCI state activated by the first MAC CE signaling is the TCI state of the PDCCH or the set of TCI states of the PDSCH. Correspondingly, the second TCI state activated by the second MAC CE signaling is the TCI state of the PDCCH or the set of TCI states of the PDSCH.

In the disclosure, when the terminal does not receive the second MAC CE signaling for activating the second TCI state from the network device and the first TCI state activated by the first MAC CE signaling is the TCI state of the PDCCH, S66 is performed. In the disclosure, when the terminal does not receive the second MAC CE signaling for activating the second TCI state from the network device and the first TCI state activated by the first MAC CE signaling is the set of TCI states of the PDSCH, S67 and S68 are performed.

In S66, a PDCCH transmitted on a BWP after switching, on the BWP after switching, is received using the first TCI state.

In a S67, a DCI signaling is received.

In the disclosure, the received DCI signaling is configured to indicate a TCI state in the first TCI state and the DCI signaling is received on the BWP before switching on the serving cell or on the BWP after switching on the serving cell or on the BWP on other serving cell (for example, in the case of cross-carrier scheduling). When the first TCI state is the set of TCI states of the PDSCH, the received DCI signaling is configured to indicate one TCI state in the set of TCI states.

In S68, a PDSCH transmitted on a BWP after switching is received using the TCI state indicated by the DCI.

In the disclosure, when the terminal receives the second MAC CE signaling for activating the second TCI state from the network device, S69 is performed.

In S69, the first TCI state activated by the first MAC CE signaling is updated to the second TCI state activated by the second MAC CE signaling.

In the disclosure, when the BWP switching occurs on any serving cell of the terminal, the network device schedules the radio bear (RB) on the new BWP to transmit the PDSCH to the terminal. If there is no new MAC signaling during this period to activate the new TCI state (or the set of TCI states), for the PDCCH, the terminal receives, on the new BWP, the PDCCH transmitted on the new BWP, based on the TCI state of the PDCCH on the previous BWP which is activated by the MAC signaling. For the set of TCI states of the PDSCH, it also uses the set of TCI states of the PDSCH on the previous BWP which is activated by the MAC signaling. The DCI signaling for indicating to receive the PDSCH using a TCI state in the set of TCI states activated by the MAC signaling may be transmitted by the BWP before switching, the new BWP after the terminal is switched to the new BWP or the BWP on other serving cell when it is cross-carrier scheduling. The terminal combines the DCI signaling for scheduling the PDSCH on the new BWP and the set of TCI states activated by the original MAC signaling to determine the TCI state for receiving the PDSCH on the new BWP, until a new MAC signaling reactivates the new TCI state of the PDCCH or the new set of TCI states of the PDSCH TCI.

Case 2: SCell Switching Occurs

Figure 8:
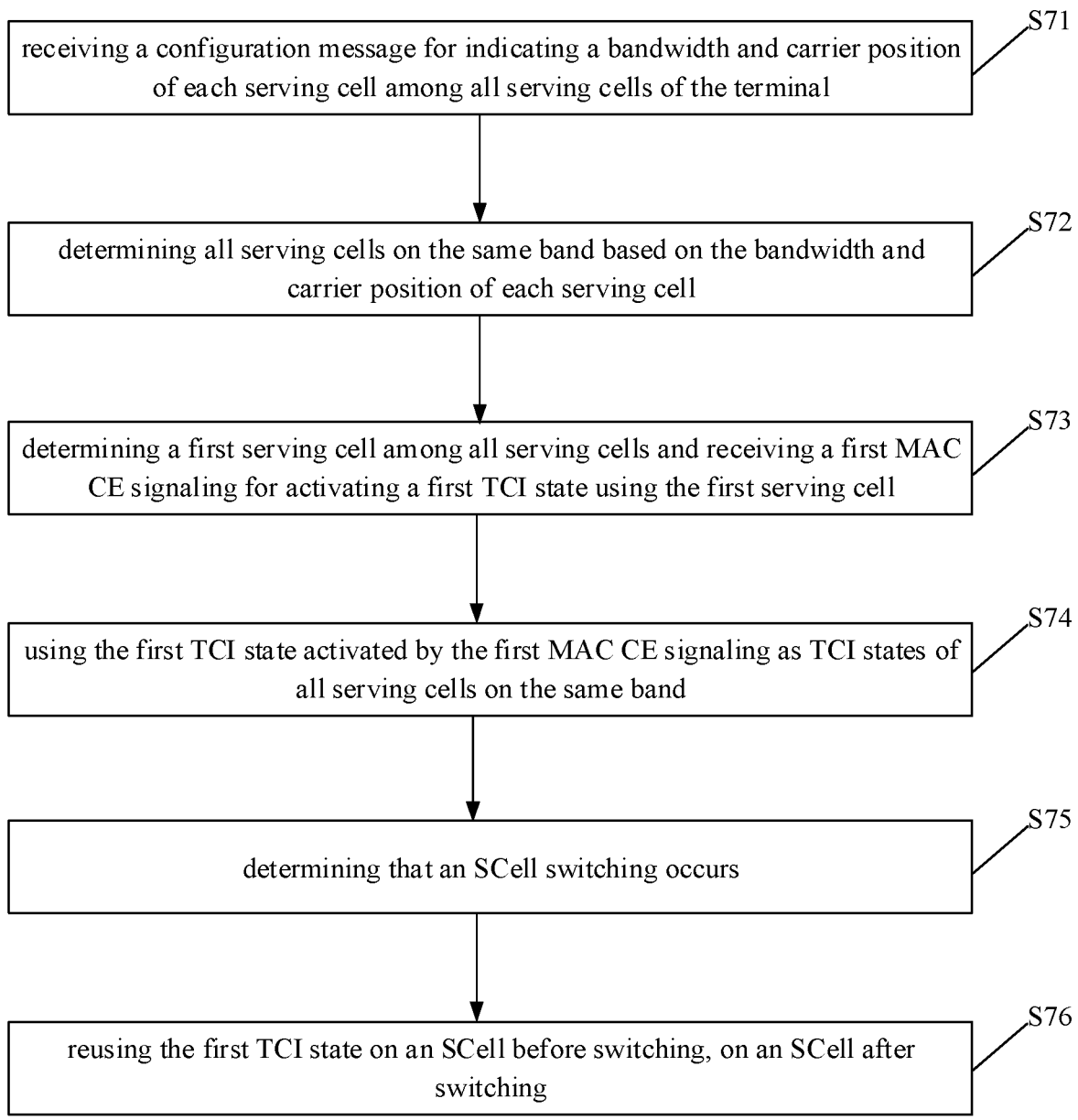
FIG. 8 is a flow chart illustrating a method for activating a TCI state according to some embodiments.

FIG. 8 is a flow chart illustrating a method for activating a TCI state according to some embodiments. As illustrated in FIG. 8, the method for activating the TCI state is applicable to the terminal and includes the following S71 to S76.

In S71, a configuration message is received, in which the configuration message is configured to indicate a bandwidth and carrier position of each serving cell among all serving cells of the terminal.

In S72, all serving cells on the same band are determined based on the bandwidth and carrier position of each serving cell.

In S73, a first serving cell is determined from all serving cells and an initial BWP or an active BWP of the first serving cell is used to receive a first MAC CE signaling for activating a first TCI state.

In S74, the first TCI state activated by the first MAC CE signaling is used as TCI states of all serving cells on the same band.

In S75, it is determined that an SCell switching occurs.

In the disclosure, when any SCell among all SCells on the same band may be switched, the terminal determines that the SCell switching occurs.

In S76, the first TCI state on an SCell before switching is reused on an SCell after switching.

In the disclosure, the first TCI state activated by the first MAC CE signaling is the TCI state of the PDCCH or the set of TCI states of the PDSCH. Correspondingly, the second TCI state activated by the second MAC CE signaling is the TCI state of the PDCCH or the set of TCI states of the PDSCH.

In the disclosure, when an SCell switching occurs on one of the SCells on the same band, the SCell after switching also needs to reuse the TCI state of the PDCCH and the set of TCI states of the PDSCH activated by the first MAC CE signaling on the original SCell.

Case 3: PSCell or PCell Switching Occurs

Figure 9:
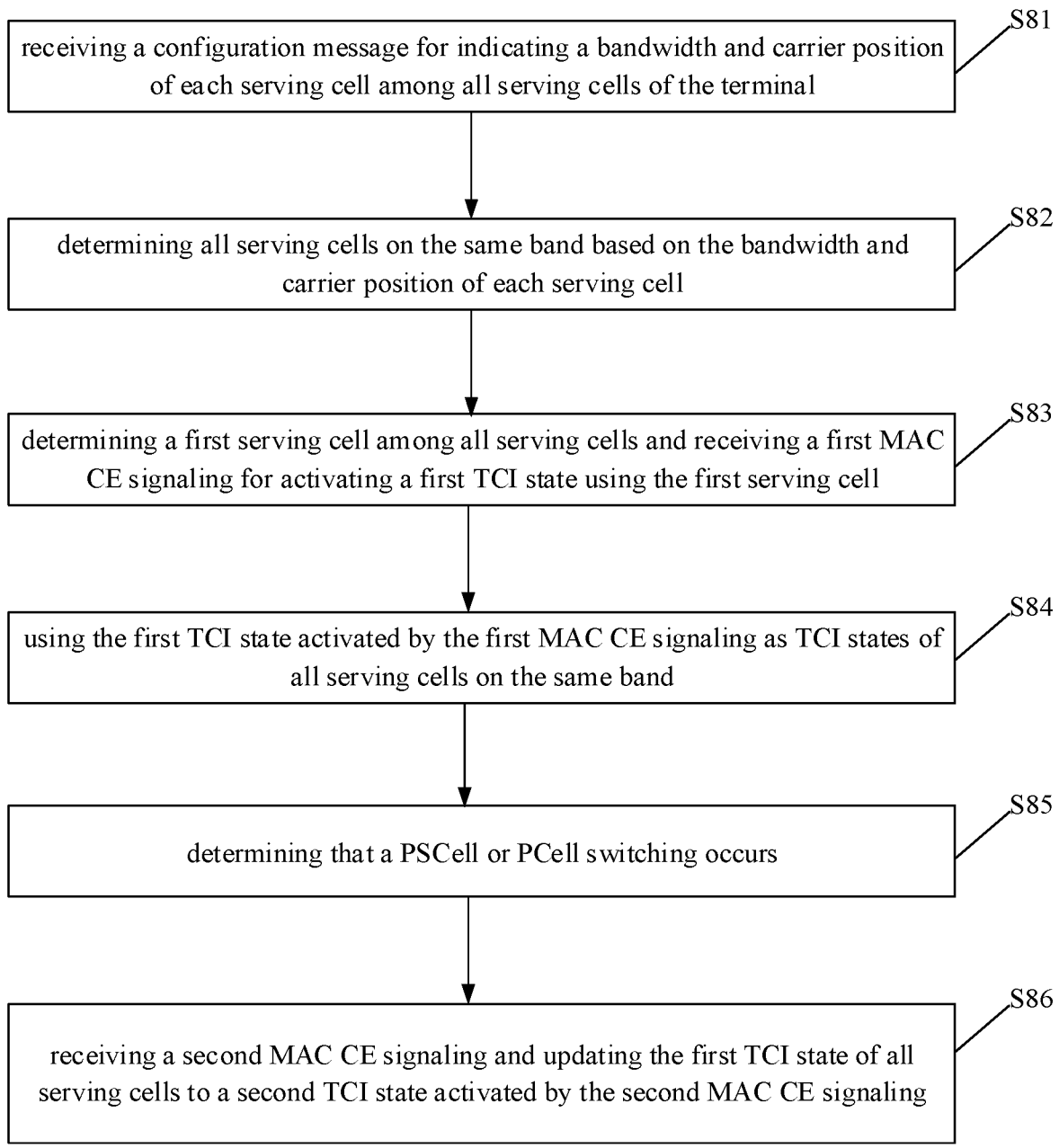
FIG. 9 is a flow chart illustrating a method for activating a TCI state according to some embodiments.

FIG. 9 is a flow chart illustrating a method for activating a TCI state according to some embodiments. As illustrated in FIG. 9, the method for activating the TCI state is applicable to the terminal and includes the following S81 to S86.

In S81, a configuration message is received, in which the configuration message is configured to indicate a bandwidth and carrier position of each serving cell among all serving cells of the terminal.

In S82, all serving cells on the same band are determined based on the bandwidth and carrier position of each serving cell.

In S83, a first serving cell is determined from all serving cells and an initial BWP or an active BWP of the first serving cell is used to receive a first MAC CE signaling for activating a first TCI state.

In S84, the first TCI state activated by the first MAC CE signaling is used as TCI states of all serving cells on the same band.

In S85, it is determined that a PSCell or PCell switching occurs.

In S86, a second MAC CE signaling is received and the first TCI state of all serving cells is updated to a second TCI state activated by the second MAC CE signaling.

In the disclosure, the first TCI state activated by the first MAC CE signaling is the TCI state of the PDCCH or the set of TCI states of the PDSCH. Correspondingly, the second TCI state activated by the second MAC CE signaling is the TCI state of the PDCCH or the set of TCI states of the PDSCH.

In the disclosure, when the PSCell or PCell switching occurs on the same band, the TCI state needs to be reconfigured, so that the TCI states of all CCs/BWPs on the band needs to be updated, that is, the new RRC signaling, the new MAC CE signaling and the like may be used for performing the TCI state configuration.

Case 4: Beam Failure Occurs

Figure 10:
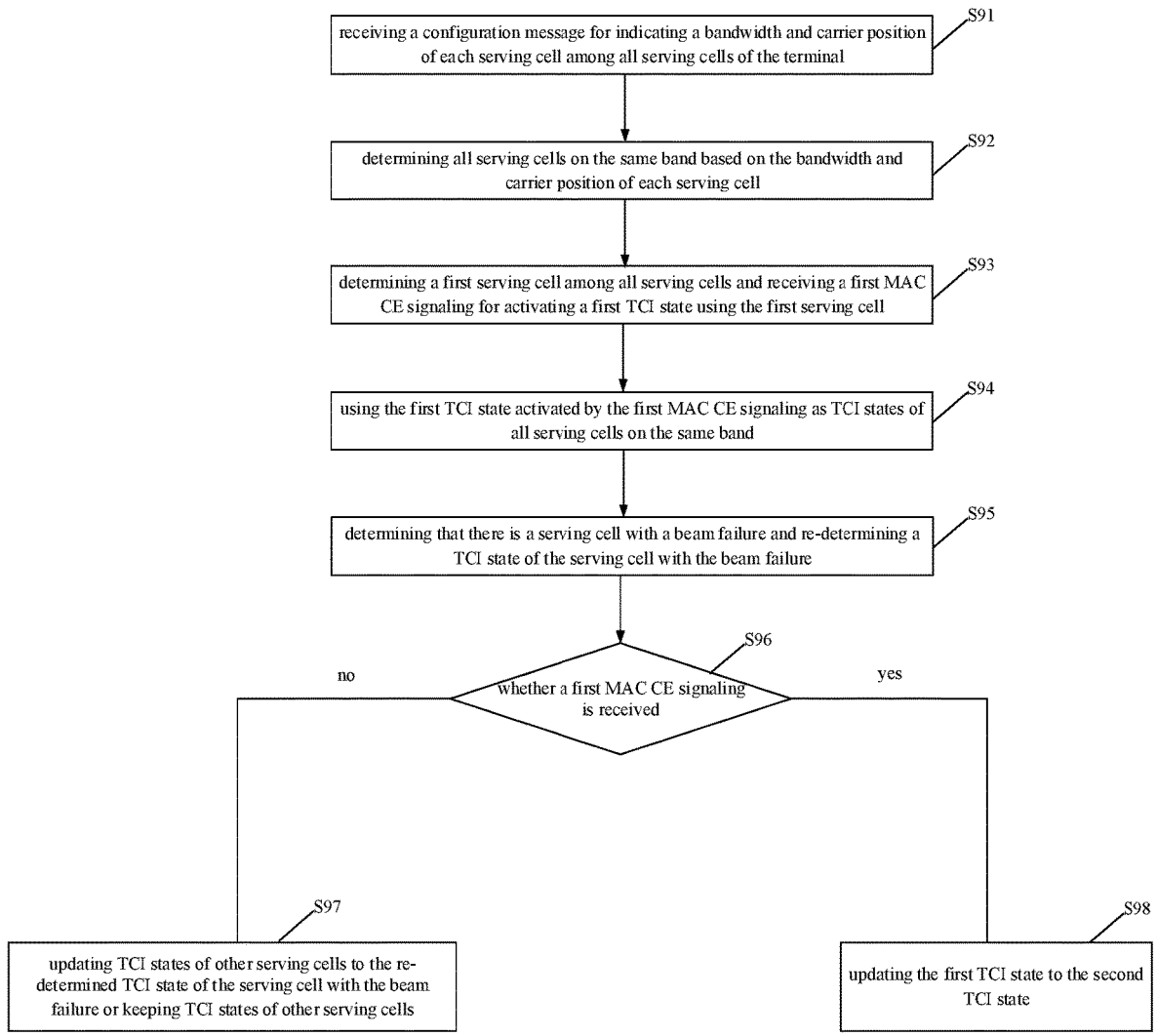
FIG. 10 is a flow chart illustrating a method for activating a TCI state according to some embodiments.

FIG. 10 is a flow chart illustrating a method for activating a TCI state according to some embodiments. As illustrated in FIG. 10, the method for activating the TCI state is applicable to the terminal and includes the following S91 to S96.

In S91, a configuration message is received, in which the configuration message is configured to indicate a bandwidth and carrier position of each serving cell among all serving cells of the terminal.

In S92, all serving cells on the same band are determined based on the bandwidth and carrier position of each serving cell.

In S93, a first serving cell is determined from all serving cells and an initial BWP or an active BWP of the first serving cell is used to receive a first MAC CE signaling for activating a first TCI state.

In S94, the first TCI state activated by the first MAC CE signaling is used as TCI states of all serving cells on the same band.

In S95, it is determined that there is a serving cell with a beam failure and a TCI state of the serving cell with the beam failure is re-determined.

In the disclosure, when the beam failure occurs on one of the serving cells on the same band, the TCI state of the PDCCH on the SCell needs to be updated, and the terminal re-determines the TCI state of the PDCCH or the set of TCI states of the PDSCH on the SCell.

The TCI state of the PDCCH may be determined by the terminal itself through measurement. For example, on the one hand, the terminal detects that the SSB for new beam discovery finds that the RSRP and/or SINR are high, and transmits the corresponding random access preamble on the physical random access channel (PRACH) corresponding to the SSB. The network device may determine that it is appropriate to use the same beam of the SSB to transmit the PDCCH or PDSCH to the terminal. On the other hand, it may also be that the terminal reports the measurement result to the network device through measurement or reports a selected new beam ID to the network device, and the network device uses one or more of the one or more reported by the terminal to transmit the PDCCH or PDSCH to the terminal.

In S96, it is determined whether a second MAC CE signaling for activating a second TCI state transmitted by the network device is received.

When the terminal does not receive the second TCI state activated by the second MAC CE, S97 is executed. When the terminal receives the second TCI state activated by the second MAC CE, S98 is executed.

In S97, TCI states of all serving cells other than the serving cell with the beam failure are updated to the re-determined TCI state of the serving cell with the beam failure or TCI states of all serving cells other than the serving cell with the beam failure remain unchanged.

In S98, the first TCI state activated by the first MAC CE signaling is updated to the second TCI state activated by the second MAC CE signaling.

In the disclosure, when the beam failure occurs on one of the serving cells on the same band, the terminal re-determines the TCI state for receiving the PDCCH on the SCell or the set of TCI states for receiving the PDSCH on the SCell. The TCI state of the PDCCH may be determined by the terminal through measurement. In this process, since it is not the MAC CE signaling to reactivate the new TCI state for the SCell with the beam failure, there are two options for other serving cells on the band except for the serving cell with the beam failure. One is to continue to use the previous TCI state or set of TCI states activated by the MAC CE signaling. The other is to use the same TCI state as the serving cell with the beam failure. When the base station uses the new MAC signaling to activate the new TCI state for the serving cell with the beam failure, all serving cells on the same band, that is, CCs/BWPs, use the new TCI state activated by MAC.

Case 5: Link Failure Occurs

The link failure on the terminal indicates that the TCI state of the PDCCH of the PCell or the PSCell of the terminal needs to be updated. In this case, before the second TCI state activated by the second MAC CE is received, the TCI states of the serving cells other than the PCell or PSCell may also have two manners. One is to continue to use the first TCI state activated by the first MAC CE. The other is to use the same re-determined TCI state as the PCell or PSCell.

Figure 11:
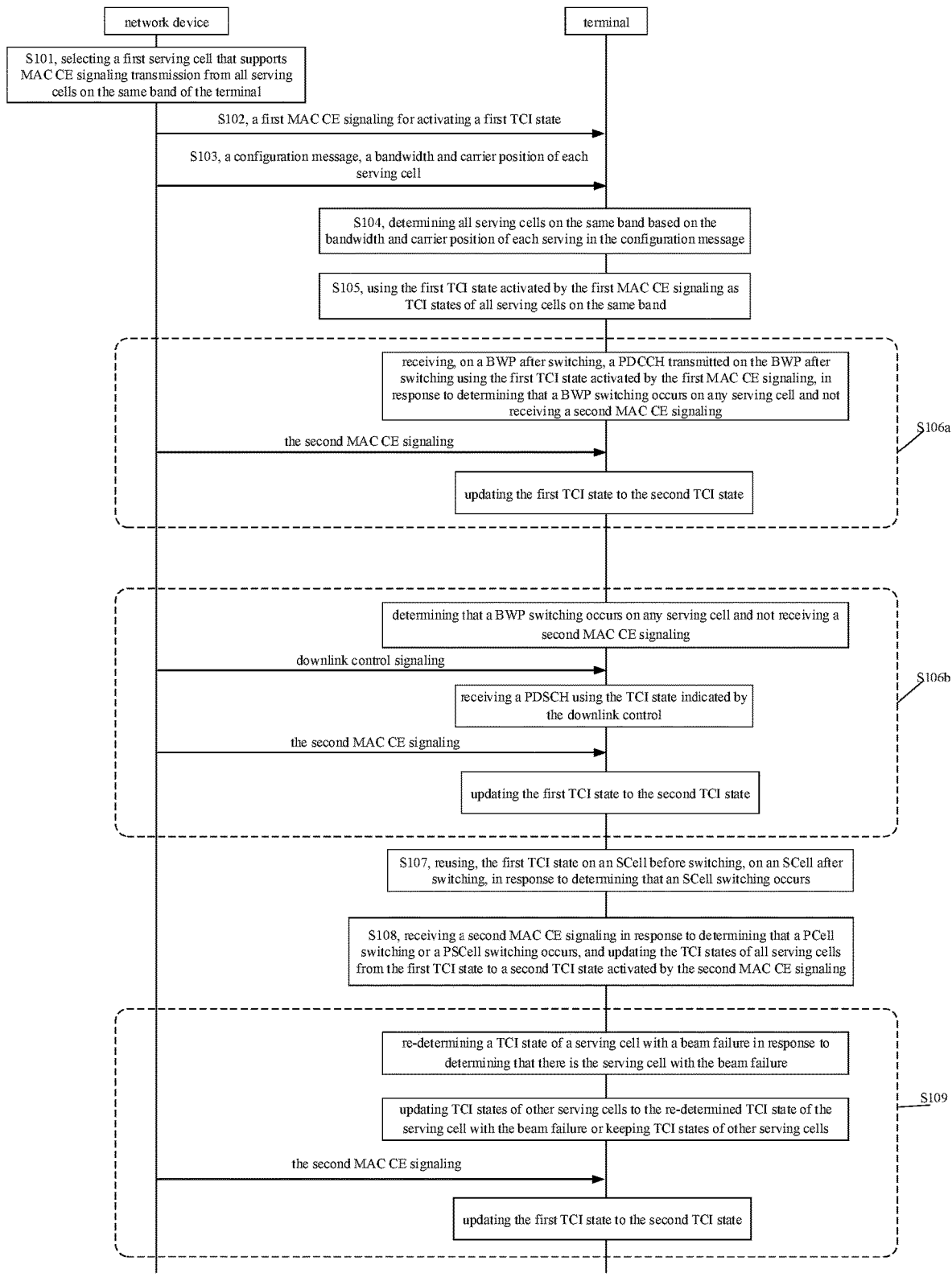
FIG. 11 is a flow chart illustrating a method for activating a TCI state according to some embodiments.

FIG. 11 is a flow chart illustrating a method for activating a TCI state according to some embodiments. As illustrated in FIG. 11, the method for activating the TCI state is applicable to an interaction process between the terminal and the network device and includes the following S101 to S109.

In S101, the network device selects a first serving cell from all serving cells on the same band of the terminal, in which the selected first serving cell supports MAC CE signaling transmission.

In S102, the network device uses the selected first serving cell to transmit a first MAC CE signaling, in which the first MAC CE signaling is configured to activate a first TCI state. The terminal receives the first MAC CE signaling.

In S103, the network device transmits a configuration message, in which the configuration message is configured to indicate a bandwidth and carrier position of each serving cell among all serving cells of the terminal. The terminal receives the configuration message from the network device.

In S104, the terminal determines all serving cells on the same band based on the bandwidth and carrier position of each serving cell in the configuration message.

It should be understood that S103 and S104 in the disclosure are optional. S103 and S104 may occur before S101. For example, when the terminal uses a predefined method to determine all serving cells on the same band, there is no need to perform S103 and S104.

In S105, the terminal uses the first TCI state as TCI states of all serving cells on the same band.

In the disclosure, after the terminal uses the first TCI state as the TCI states of all serving cells on the same band, the following may be included according to actual application scenarios.

In S106a, if it is determined that a BWP switching occurs on any serving cell and a second MAC CE signaling is not received, a PDCCH transmitted on a BWP after switching is received on the BWP after switching using the first TCI state. If the second MAC CE signaling is received, the first TCI state is updated to the second TCI state.

In S106b, if it is determined that a BWP switching occurs on any serving cell and a second MAC CE signaling is not received, a DCI is received and the DCI is configured to indicate a TCI state in the first TCI state. The TCI state indicated by the DCI is configured to receive a PDSCH transmitted on a BWP after switching. If the second MAC CE signaling is received, the first TCI state is updated to the second TCI state.

In S107, if it is determined that a SCell switching occurs, the first TCI state on an SCell before switching is reused on an SCell after switching.

In S108, if it is determined that a PCell or PSCell switching occurs, the second MAC CE signaling is received and the first TCI state of all serving cells is updated to the second TCI state activated by the second MAC CE signaling.

In S109, if it is determined that there is a serving cell with a beam failure, a TCI state of the serving cell with the beam failure is re-determined. If the second TCI state activated by the second MAC CE signaling is not received, TCI states of all serving cells other than the serving cell with the beam failure are updated to the re-determined TCI state of the serving cell with the beam failure. Or, TCI states of all serving cells other than the serving cell with the beam failure are kept. If the second MAC CE signaling is received, the first TCI state is updated to the second TCI state.

It should be understood that in the method for activating the TCI state in the interaction process between the terminal and the network device in the disclosure, the terminal and the network device respectively have the method for activating the TCI state for the terminal and the network device involved in the above embodiments of the disclosure. Where the description of the method for activating the TCI state in the interaction process between the terminal and the network device in the disclosure is not detailed enough, reference should be made to the description of the related embodiments, which will not be repeated herein.

Based on the same concept, embodiments of the disclosure also provide an apparatus for activating a TCI state.

It should be understood that, in order to realize the above-mentioned functions, the apparatus for activating the TCI state provided in embodiments of the disclosure includes hardware structures and/or software modules corresponding to various functions. In combination with units and algorithm actions of the examples disclosed in embodiments of the disclosure, embodiments of the disclosure may be implemented in the form of hardware or a combination of hardware and computer software. Whether a certain function is executed by hardware or computer software-driven hardware depends on applications and design constraint conditions of the technical solution. Those skilled in the art may use different manners for each specific application to implement the described functions, but such implementation should not be considered as going beyond the scope of the technical solutions of embodiments of the disclosure.

Figure 12:
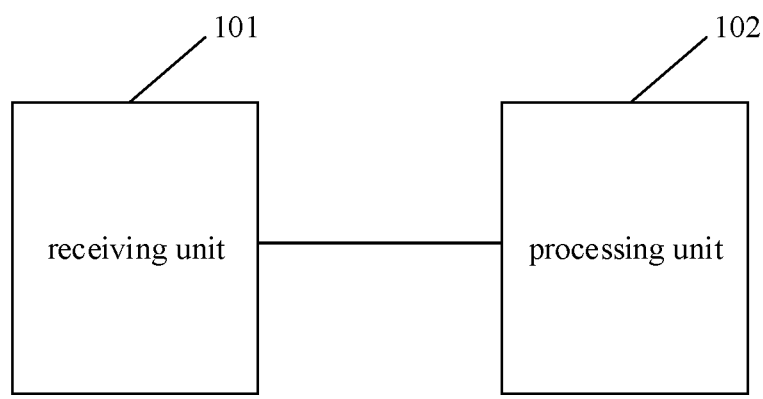
FIG. 12 is a block diagram illustrating an apparatus for activating a TCI state according to some embodiments.

FIG. 12 is a block diagram illustrating an apparatus 100 for activating a TCI state according to some embodiments. Referring to FIG. 12, the apparatus 100 for activating the TCI state is applicable to a terminal and includes a receiving unit 101 and a processing unit 102.

The receiving unit 101 is configured to receive a first MAC CE signaling, the first MAC CE signaling for activating a first TCI state. The processing unit 102 is configured to use the first TCI state as TCI states of all serving cells on the same frequency band.

In some embodiments, the first TCI state includes a TCI state of a PDCCH.

The processing unit 102 is further configured to determine whether a BWP switching occurs.

The receiving unit 101 is further configured to receive a PDCCH transmitted on a BWP after switching using the first TCI state, in response to the processing unit 102 determining that the BWP switching occurs on any serving cell and a second MAC CE signaling not being received by the receiving unit 101.

In some embodiments, the first TCI state includes a set of TCI states of a PDSCH.

The processing unit 102 is further configured to determine whether a BWP switching occurs.

The receiving unit 101 is further configured to receive a downlink control signaling in response to the processing unit 102 determining that the BWP switching occurs on any serving cell and a second MAC CE signaling not being received by the receiving unit 101, and receive a PDSCH transmitted on a BWP after switching using a TCI state indicated by the downlink control signaling.

The downlink control signaling for indicating the TCI state in the first TCI state, and the second MAC CE signaling for activating a second TCI state.

In some embodiments, the processing unit 102 is further configured to determine whether an SCell switching occurs; and reuse, the first TCI state on an SCell before switching, on an SCell after switching, in response to determining that the SCell switching occurs.

In some embodiments, the processing unit 102 is further configured to determine whether a PCell switching or a PSCell switching occurs.

The receiving unit 101 is further configured to receive a second MAC CE signaling in response to the processing unit 102 determining that the PCell switching or the PSCell switching occurs, and update the TCI states of all serving cells from the first TCI state to a second TCI state activated by the second MAC CE signaling.

In some embodiments, the processing unit 102 is further configured to determine whether there is a serving cell with a beam failure.

The processing unit 102 is further configured to re-determine a TCI state of the serving cell with the beam failure in response to determining that there is the serving cell with the beam failure, and before the receiving unit 101 receiving a second TCI state activated by a second MAC CE signaling, update TCI states of all serving cells other than the serving cell with the beam failure to the re-determined TCI state of the serving cell with the beam failure or keep TCI states of all serving cells other than the serving cell with the beam failure.

In some embodiments, the receiving unit 101 is further configured to receive the second MAC CE signaling, the second MAC CE signaling for activating the second TCI state.

The processing unit 102 is further configured to update the first TCI state to the second TCI state.

In some embodiments, the receiving unit 101 is configured to receive the first MAC CE signaling by: receiving the first MAC CE signaling using an initial BWP or an active BWP of a determined first serving cell.

In some embodiments, the receiving unit 101 is further configured to receive a configuration message, the configuration message for indicating a bandwidth and carrier position of each serving cell among all serving cells of the terminal; and the processing unit 102 is further configured to determine all serving cells on the same frequency band using the bandwidth and carrier position.

Figure 13:
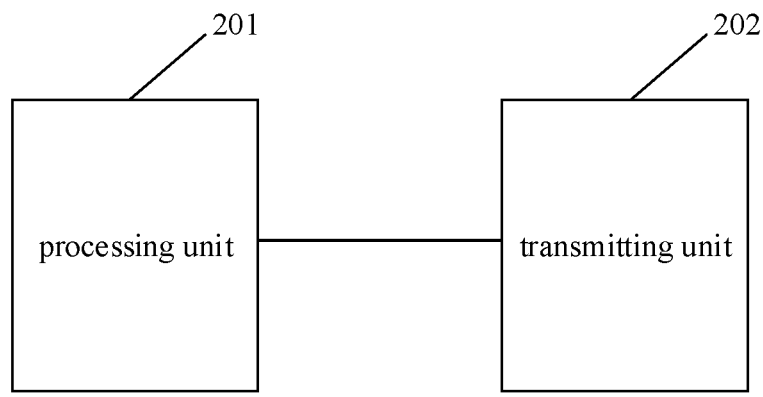
FIG. 13 is a block diagram illustrating an apparatus for activating a TCI state according to some embodiments.

FIG. 13 is a block diagram illustrating an apparatus 200 for activating a TCI state according to some embodiments. Referring to FIG. 13, the apparatus 200 for activating the TCI state is applicable to a network device and includes a processing unit 201 and a transmitting unit 202.

The processing unit 201 is configured to select a first serving cell from all serving cells on the same frequency band of a terminal, the first serving cell for supporting transmission of a MAC CE signaling.

The transmitting unit 202 is configured to transmit a first MAC CE signaling using the selected first serving cell, the first MAC CE signaling for activating a first TCI state.

In some embodiments, the processing unit 201 is configured to select randomly the first serving cell from all serving cells on the same frequency band of the terminal; or select a designated first serving cell from all serving cells on the same frequency band of the terminal.

In some embodiments, the designated first serving cell includes a serving cell with a lowest carrier frequency among all serving cells; or the designated first serving cell includes a PSCell or a PCell among all the serving cells; or the designated first serving cell includes a serving cell whose channel is detected to be idle on an unlicensed spectrum.

In some embodiments, the transmitting unit 202 is configured to transmit the MAC CE signaling using an initial BWP or an active BWP on the selected first serving cell.

In some embodiments, the transmitting unit 202 is further configured to transmit a second MAC CE signaling, the second MAC CE signaling for activating a second TCI state.

In some embodiments, the processing unit 201 is further configured to: before the transmitting unit 202 transmitting the second MAC CE signaling, determine one or a combination of the following events: a change on a channel condition of the terminal, a BWP switching on the terminal, an SCell switching on the terminal, a PCell switching or a PSCell switching on the terminal or a serving cell with a beam failure on the terminal.

In some embodiments, the transmitting unit 202 is further configured to transmit a configuration message, the configuration message for indicating a bandwidth and carrier position of each serving cell among all serving cells of the terminal.

In some embodiments, the first TCI state includes: a TCI state of a PDCCH or a set of TCI states of a PDSCH.

With respect to the apparatuses in the above embodiments, the specific manners for performing operations for individual modules therein have been described in detail in the embodiments regarding the methods, which will not be elaborated herein.

Figure 14:
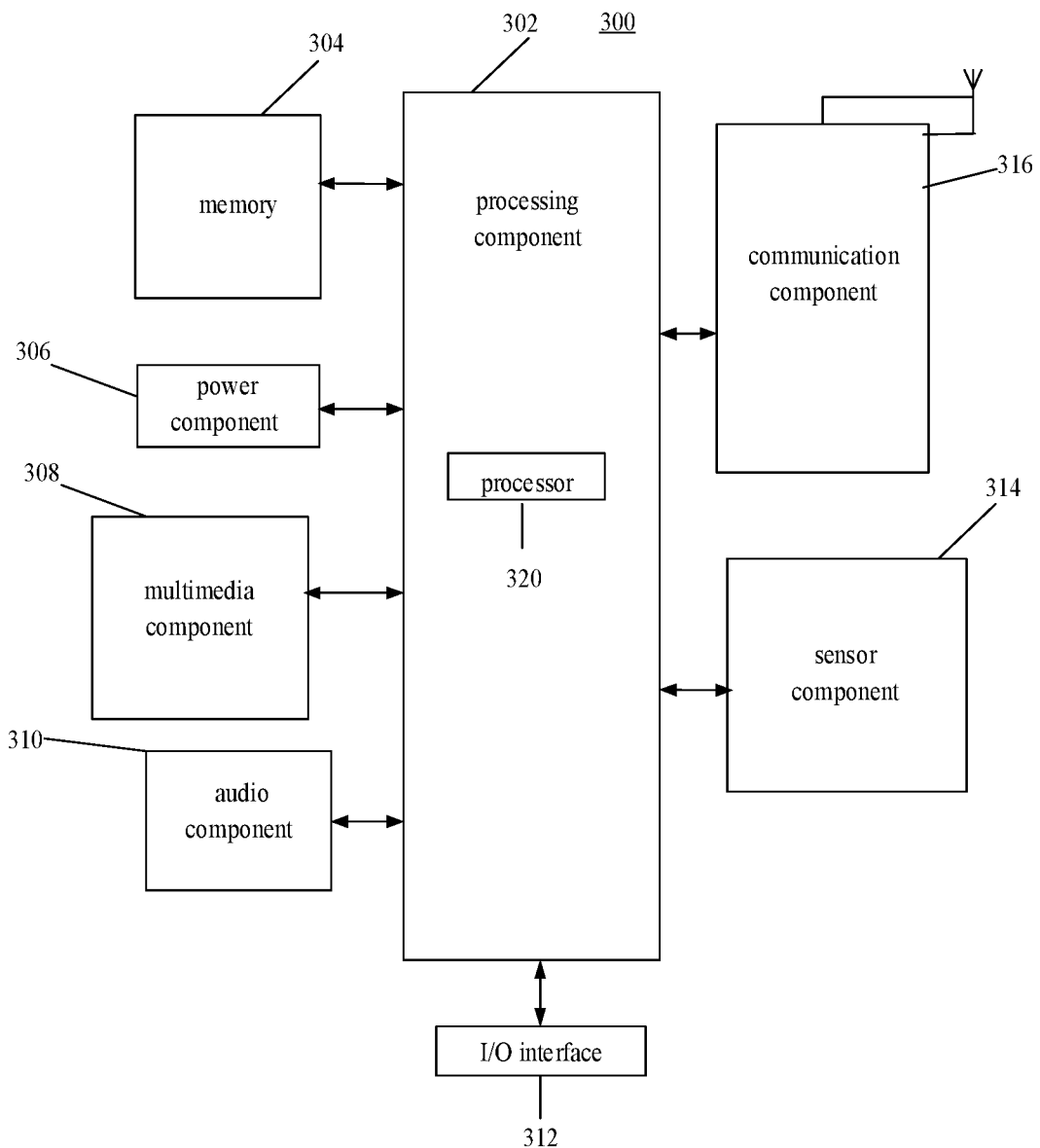
FIG. 14 is a block diagram illustrating a device for activating a TCI state according to some embodiments.

FIG. 14 is a block diagram illustrating a device 300 for activating a TCI state according to some embodiments. For example, the device 300 may be a mobile phone, a computer, a digital broadcast terminal, a messaging device, a gaming console, a tablet, a medical device, exercise equipment, a personal digital assistant, and the like.

Referring to FIG. 14, the device 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, telephone calls, data communications, camera operations, and recording operations. The processing component 302 may include one or more processors 320 to execute instructions to perform all or part of the actions in the above described methods. Moreover, the processing component 302 may include one or more modules which facilitate the interaction between the processing component 302 and other components. For instance, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, video, etc. The memory 304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 provides power to various components of the device 300. The power component 306 may include a power management system, one or more power sources, and any other components associated with the generation, management, and distribution of power in the device 300.

The multimedia component 308 includes a screen providing an output interface between the device 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front camera and/or a rear camera. The front camera and the rear camera may receive an external multimedia datum while the device 300 is in an operation mode, such as a photographing mode or a video mode. Each of the front camera and the rear camera may be a fixed optical lens system or have focus and optical zoom capability.

The audio component 310 is configured to output and/or input audio signals. For example, the audio component 310 includes a microphone ("MIC") configured to receive an external audio signal when the device 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 may detect an open/closed status of the device 300, relative positioning of components, e.g., the display and the keypad, of the device 300, a change in position of the device 300 or a component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 can access a wireless network based on a communication standard, such as WiFi, 2G, or 3G, or a combination thereof. In one exemplary embodiment, the communication component 316 receives a broadcast signal or broadcast associated information from an external broadcast management system via a broadcast channel. In one exemplary embodiment, the communication component 316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 304, executable by the processor 320 in the device 300, for performing the above-described methods. For example, the non-transitory computer-readable storage medium may be a ROM, a RAM, a CD-ROM, a magnetic tape, a floppy disc, an optical data storage device, and the like.

Figure 15:
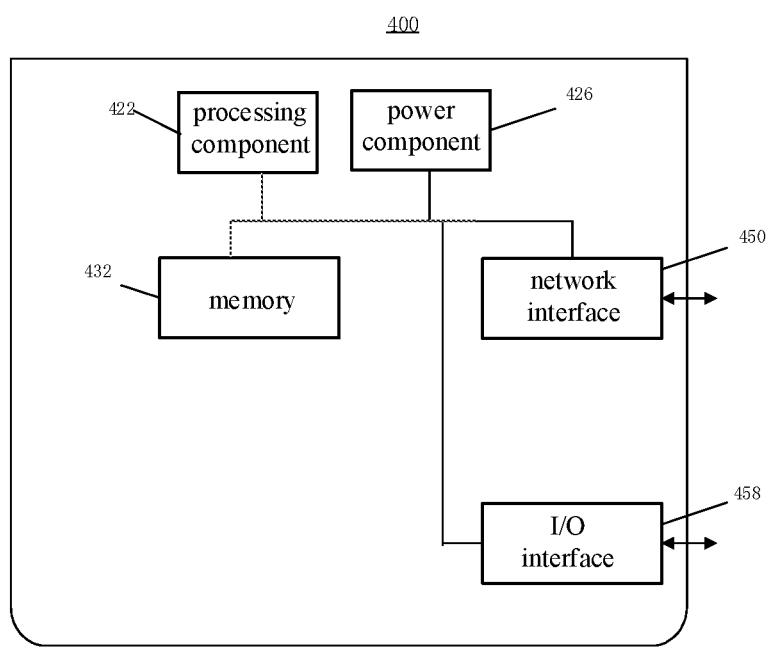
FIG. 15 is a block diagram illustrating a device for activating a TCI state according to some embodiments.

FIG. 15 is a block diagram illustrating a device 400 for activating a TCI state according to some embodiments. For example, the device 400 may be a server. Referring to FIG. 15, the device 400 may include a processing component 422 (including one or more processors) and a memory resource represented by a memory 432 for storing instructions executable by the processing component 422 such as application programs. The application programs stored in the memory 432 may include one or more modules each corresponding to a set of instructions. Additionally, the processing component 422 is configured to execute instructions to perform the above-described methods.

The device 400 further includes a power component 426 configured to perform power management of the device 400, a wired or wireless network interface 450 configured to connect the device 400 to a network and an input/output interface 458. The device 400 may operate based on an operating system stored in the memory 432, such as Windows Server™, Mac OS X™, Unix™, Linux™, FreeBSD™ or the like.

In exemplary embodiments, there is also provided a non-transitory computer-readable storage medium including instructions, such as included in the memory 404, executable by the processor 420 in the device 400, for performing the above-described methods. For example, the non-transitory computer-readable storage medium may be a ROM, a RAM, a CD-ROM, a magnetic tape, a floppy disc, an optical data storage device, and the like.

It should be further understood that in the disclosure, "plurality" refers to two or more and other quantifiers are similar. The term "and/or" may describe association relationships of associated objects, indicating that there may be three types of relationships, for example, A and/or B, which may mean: A exists alone, A and B exist at the same time, and B exists alone. The character "/" generally indicates that the associated objects before and after are in an "or" relationship. The singular forms "a," "an," and "the" are intended to include the plural forms as well, unless the context clearly dictates otherwise.

It should be further understood that the terms "first", "second", etc. describe various information, but the information should not be limited to these terms. These terms are only used to distinguish the same type of information from each other, and do not imply a particular order or level of importance. For example, without departing from the scope of the disclosure, the first information may also be referred to as the second information, and similarly, the second information may also be referred to as the first information.

It should be further understood that, although operations in embodiments of the disclosure are described in a specific order in the drawings, it should not be construed as requiring that the operations be performed in the specific order shown or the serial order, or requiring to perform all operations shown to obtain the desired result. In certain circumstances, multitasking and parallel processing may be advantageous.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for activating a transmission configuration indicator (TCI) state, comprising:
   receiving, by a terminal, a first medium access control (MAC) control element (CE) signaling, the first MAC CE signaling for activating a first TCI state; and
   using, by the terminal, the first TCI state as TCI states of serving cells on a same frequency band;
   wherein the first TCI state comprises a set of TCI states of a physical downlink shared channel (PDSCH);
   wherein after using the first TCI state as the TCI states of serving cells on the same frequency band, the method further includes:
   receiving, by the terminal, a downlink control signaling and determining that a bandwidth part (BWP) switching to another BWP occurs on any serving cell, wherein the downlink control signaling indicates a TCI state from the set of TCI states; and
   receiving, by the terminal, a PDSCH transmitted on the another BWP using the TCI state indicated by the downlink control signaling, while a second MAC CE signaling is not received, wherein the second MAC CE signaling activates a second TCI state.

2. The method as claimed in claim 1, wherein the first TCI state comprises a TCI state of a physical downlink control channel (PDCCH);
   wherein after using the first TCI state as the TCI states of serving cells on the same frequency band, the method further includes:
   determining, by the terminal, that a bandwidth part (BWP) switching to another BWP occurs on any serving cell, and receiving, on the another BWP, a PDCCH transmitted on the another BWP using the first TCI state, while the second MAC CE signaling is not received, wherein the second MAC CE signaling activates a second TCI state.

3. The method as claimed in claim 2, further comprising:
   receiving, by the terminal, the second MAC CE signaling, the second MAC CE signaling for activating the second TCI state; and
   updating, by the terminal, the first TCI state to the second TCI state.

4. The method as claimed in claim 1, after using the first TCI state as the TCI states of serving cells on the same frequency band, further comprising:
   determining, by the terminal, that a secondary cell (SCell) switching to another SCell occurs and reusing, the first TCI state on the SCell, on the another SCell.

5. The method as claimed in claim 1, after using the first TCI state as the TCI states of serving cells on the same frequency band, further comprising:
   receiving, by the terminal, a second MAC CE signaling and determining that a primary cell (PCell) switching to another Pcell or a primary and secondary cell (PSCell) switching to another PSCell occurs,
   updating, by the terminal, the TCI states of serving cells from the first TCI state to a second TCI state activated by the second MAC CE signaling.

6. The method as claimed in claim 1, after using the first TCI state as the TCI states of serving cells on the same frequency band, further comprising:
   re-determining, by the terminal, a TCI state of a serving cell with a beam failure and determining that there is the serving cell with the beam failure;
   updating, by the terminal, TCI states of serving cells other than the serving cell with the beam failure to the re-determined TCI state of the serving cell with the beam failure or keeping TCI states of serving cells other than the serving cell with the beam failure, before receiving a second TCI state activated by a second MAC CE signaling.

7. The method as claimed in claim 1, wherein receiving the first MAC CE signaling comprises:
   receiving the first MAC CE signaling using an initial bandwidth part (BWP) or an active BWP of a determined first serving cell.

8. The method as claimed in claim 1, before receiving the first MAC CE signaling, further comprising:
   receiving, by the terminal, a configuration message, the configuration message for indicating a bandwidth and carrier position of each serving cell among the serving cells of the terminal; and
   determining, by the terminal, serving cells on the same frequency band using the bandwidth and carrier position.

9. A non-transitory computer-readable storage medium having stored therein instructions that, when executed by a processor of a mobile terminal, causes the mobile terminal to perform the method as claimed in claim 1.

10. A method for activating a transmission configuration indicator (TCI) state, comprising:
    selecting, by a network device, a first serving cell from serving cells on a same frequency band of a terminal, the first serving cell for supporting transmission of a medium access control (MAC) control element (CE) signaling; and
    transmitting, by the network device, a first MAC CE signaling using the selected first serving cell, the first MAC CE signaling for activating a first TCI state; the first TCI state used as TCI states of serving cells on a same frequency band;
    transmitting, by the network device, a downlink control signaling and determining that a bandwidth part (BWP) switching to another BWP occurs on any serving cell, wherein the first TCI state comprises a set of TCI states of a physical downlink shared channel (PDSCH) and wherein the downlink control signaling indicates a TCI state from the set of TCI states;
    transmitting, by the network device, a PDSCH transmitted on the another BWP using the TCI state indicated by the downlink control signaling, while not transmitting a second MAC CE signaling, wherein the second MAC CE signaling activates a second TCI state.

11. The method as claimed in claim 10, wherein selecting the first serving cell from serving cells on the same frequency band of the terminal comprises:
    selecting randomly the first serving cell from serving cells on the same frequency band of the terminal; or
    selecting a designated first serving cell from serving cells on the same frequency band of the terminal.

12. The method as claimed in claim 11, wherein the designated first serving cell comprises a serving cell with a lowest carrier frequency among serving cells; or the designated first serving cell comprises a primary and secondary cell (PSCell) or a primary cell (PCell) among the serving cells; or the designated first serving cell comprises a serving cell whose channel is detected to be idle on an unlicensed spectrum.

13. The method as claimed in claim 10, wherein transmitting the MAC CE signaling using the selected first serving cell comprises:
   transmitting the MAC CE signaling using an initial bandwidth part (BWP) or an active BWP on the selected first serving cell.

14. The method as claimed in claim 10, further comprising:
   transmitting, by the network device, a second MAC CE signaling, the second MAC CE signaling for activating a second TCI state.

15. The method as claimed in claim 14, before transmitting the second MAC CE signaling, further comprising:
   determining, by the network device, one or a combination of the following events:
   a change on a channel condition of the terminal, a bandwidth part (BWP) switching to another BWP on the terminal, a secondary cell (SCell) switching to another SCell on the terminal, a primary cell (PCell) switching to another PCell or a primary and secondary cell (PSCell) switching to another PSCell on the terminal or a serving cell with a beam failure on the terminal.

16. The method as claimed in claim 10, further comprising:
   transmitting, by the network device, a configuration message, the configuration message for indicating a bandwidth and carrier position of each serving cell among serving cells of the terminal.

17. The method as claimed in claim 10, wherein the first TCI state comprises:
   a TCI state of a physical downlink control channel (PDCCH).

18. A device for activating a transmission configuration indicator (TCI) state, comprising:
   a processor; and
   a memory for storing instructions executable by the processor;
   wherein the processor is configured to perform the method as claimed in claim 10.

19. A device for activating a transmission configuration indicator (TCI) state, comprising:
   a processor; and
   a memory for storing instructions executable by the processor;
   wherein the processor is configured to perform:
   receiving a first medium access control (MAC) control element (CE) signaling, the first MAC CE signaling for activating a first TCI state; and
   using the first TCI state as TCI states of serving cells on a same frequency band;
   wherein the first TCI state comprises a set of TCI states of a physical downlink shared channel (PDSCH);
   wherein after using the first TCI state as the TCI states of serving cells on the same frequency band, the method further includes:
   receiving, by the terminal, a downlink control signaling and determining that a bandwidth part (BWP) switching to another BWP occurs on any serving cell, wherein the downlink control signaling indicates a TCI state from the set of TCI states; and
   receiving, by the terminal, a PDSCH transmitted on the another BWP using the TCI state indicated by the downlink control signaling, while a second MAC CE signaling is not received, wherein the second MAC CE signaling activates a second TCI state.

* * * * *